US012696259B2

(12) United States Patent
Medina et al.

(10) Patent No.: US 12,696,259 B2
(45) Date of Patent: Jul. 28, 2026

(54) GROUP-BASED BEAM REPORTING FOR MULTI-RECEIVER OPERATION BASED ON REFERENCE SIGNAL RECEIVED POWER DIFFERENCES

(71) Applicant: NOKIA TECHNOLOGIES OY, Espoo (FI)

(72) Inventors: Daniel Medina, Munich (DE); Paolo Baracca, Munich (DE); Rafael Cauduro Dias De Paiva, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 335 days.

(21) Appl. No.: 18/598,363

(22) Filed: Mar. 7, 2024

(65) Prior Publication Data

US 2025/0287366 A1　　Sep. 11, 2025

(51) Int. Cl.
　　*H04W 72/044*　　(2023.01)
　　*H04B 17/318*　　(2015.01)
　　*H04L 5/00*　　(2006.01)
(52) U.S. Cl.
　　CPC ........ *H04W 72/046* (2013.01); *H04B 17/328* (2023.05); *H04L 5/0058* (2013.01)
(58) Field of Classification Search
　　CPC .. H04W 72/046; H04W 24/10; H04B 17/328; H04B 7/088; H04L 5/0058; H04L 5/0026
　　See application file for complete search history.

(56) References Cited

U.S. PATENT DOCUMENTS

2024/0397434 A1* 11/2024 Jiang ................... H04W 52/146

OTHER PUBLICATIONS

Vivo, "WF on NR FR2 multi-Rx chain DL reception RRM requirements (part 1)", 3GPP TSG-RAN WG4 Meeting #106, R4-2303302, Feb. 2023.
Qualcomm Incorporated, "Requirement for NR frequency range 2 (FR2) multi-RX chain DL reception", 3GPP TSG RAN Meeting #96, Jun. 2022.
"3rd Generation Partnership Project; Technical Specification Group Radio Access Network; NR; Physical layer procedures for data (Release 18)", 3GPP TS 38.214, V18.1.0, Dec. 2023.
"3rd Generation Partnership Project; Technical Specification Group Radio Access Network; NR; Radio Resource Control (RRC) protocol specification (Release 18)", 3GPP TS 38.331, V18.1.0, Dec. 2023.

* cited by examiner

*Primary Examiner* — Fred A Casca
(74) *Attorney, Agent, or Firm* — Barta Jones, PLLC

(57)　　　　　ABSTRACT

An apparatus and method for group-based beam reporting (GBBR) for multi-receiver operation based on reference signal received power (RSRP) differences is provided. The method may include determining, by a first apparatus, a candidate reference signal (RS) group to be provided to at least one second apparatus. The candidate RS group includes at least a first RS and a second RS. The method also includes determining a first difference between a first RSRP of the first RS and a second RSRP of the second RS. The method further includes determining a second difference between a third RSRP of the second RS and a fourth RSRP of the first RS, and performing at least one of excluding the candidate RS group from a group-based beam report based on the first and second differences, or transmitting, to the at least one second apparatus, information indicative of the first and second differences.

15 Claims, 3 Drawing Sheets

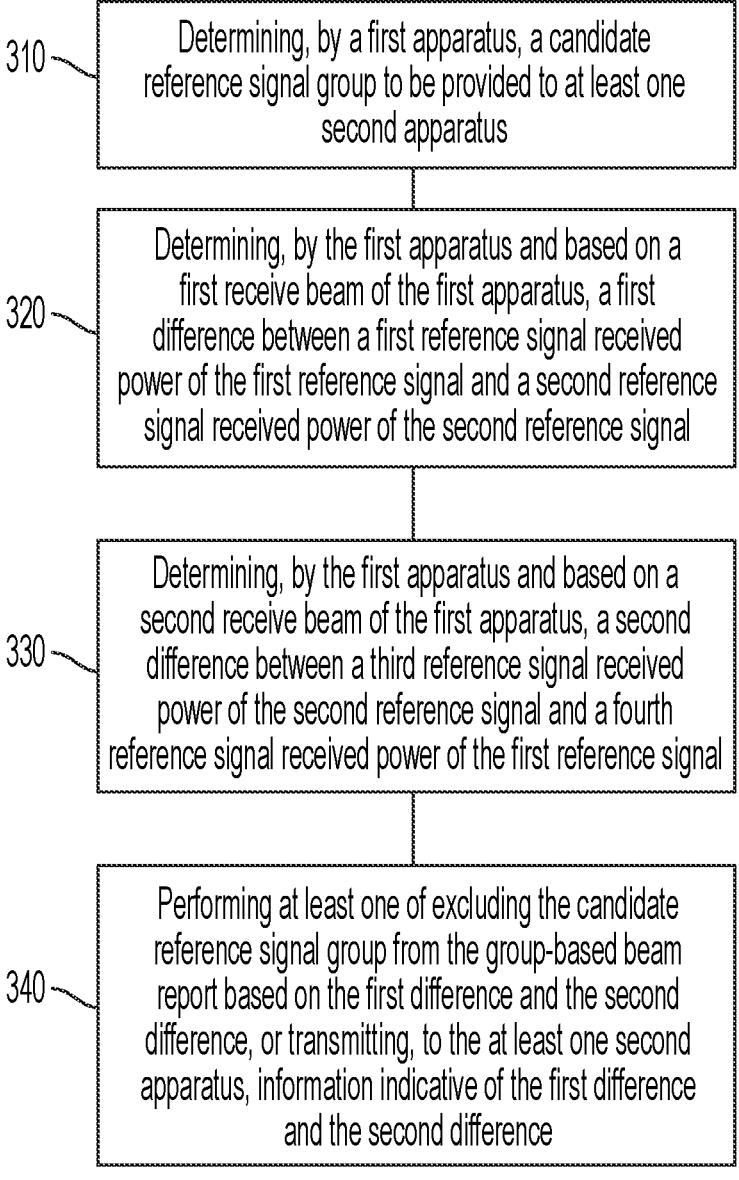

310 — Determining, by a first apparatus, a candidate reference signal group to be provided to at least one second apparatus 320 — Determining, by the first apparatus and based on a first receive beam of the first apparatus, a first difference between a first reference signal received power of the first reference signal and a second reference signal received power of the second reference signal 330 — Determining, by the first apparatus and based on a second receive beam of the first apparatus, a second difference between a third reference signal received power of the second reference signal and a fourth reference signal received power of the first reference signal 340 — Performing at least one of excluding the candidate reference signal group from the group-based beam report based on the first difference and the second difference, or transmitting, to the at least one second apparatus, information indicative of the first difference and the second difference

FIG. 3

GROUP-BASED BEAM REPORTING FOR MULTI-RECEIVER OPERATION BASED ON REFERENCE SIGNAL RECEIVED POWER DIFFERENCES

TECHNICAL FIELD

Some example embodiments may generally relate to mobile or wireless telecommunication systems, such as Long Term Evolution (LTE) or fifth generation (5G) new radio (NR) access technology, or 5G beyond, or sixth generation (6G) access technology or other communications systems. For example, certain example embodiments may relate to group-based beam reporting (GBBR) for multi-receiver (multi-Rx) operation based on reference signal received power (RSRP) differences.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, fifth generation (5G) radio access technology or new radio (NR) access technology and/or sixth generation (6G) radio access technology. Fifth generation (5G) and sixth generation (6G) wireless systems refer to the next generation (NG) of radio systems and network architecture. 5G and 6G network technology is mostly based on new radio (NR) technology, but the 5G/6G (or NG) network can also build on E-UTRAN radio. It is estimated that NR may provide bitrates on the order of 10-20 Gbit/s or higher and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Various exemplary embodiments may provide an apparatus including at least one processor and at least one memory storing instructions that, when executed by the at least one processor, cause the apparatus at least to determine a candidate reference signal group to be provided to at least one other apparatus. The candidate reference signal group may include at least a first reference signal and a second reference signal. The apparatus may also be caused to determine, based on a first receive beam of the apparatus, a first difference between a first reference signal received power of the first reference signal and a second reference signal received power of the second reference signal, and determine, based on a second receive beam of the apparatus, a second difference between a third reference signal received power of the second reference signal and a fourth reference signal received power of the first reference signal. The method may further include performing at least one of excluding the candidate reference signal group from a group-based beam report based on the first difference and the second difference, or transmitting, to the at least one other apparatus, information indicative of the first difference and the second difference.

Certain exemplary embodiments may provide a method including determining, by a first apparatus, a candidate reference signal group to be provided to at least one second apparatus. The candidate reference signal group may include at least a first reference signal and a second reference signal. The method may also include determining, by the first apparatus and based on a first receive beam of the first apparatus, a first difference between a first reference signal received power of the first reference signal and a second reference signal received power of the second reference signal, and determining, by the first apparatus and based on a second receive beam of the first apparatus, a second difference between a third reference signal received power of the second reference signal and a fourth reference signal received power of the first reference signal. The method may further include performing at least one of excluding the candidate reference signal group from the group-based beam report based on the first difference and the second difference, or transmitting, to the at least one second apparatus, information indicative of the first difference and the second difference.

BRIEF DESCRIPTION OF THE DRAWINGS

For proper understanding of example embodiments, reference should be made to the accompanying drawings, as follows:

FIG. 3 illustrates an example of a flow diagram of a method, according to some exemplary embodiments.

DETAILED DESCRIPTION

Figure 1:
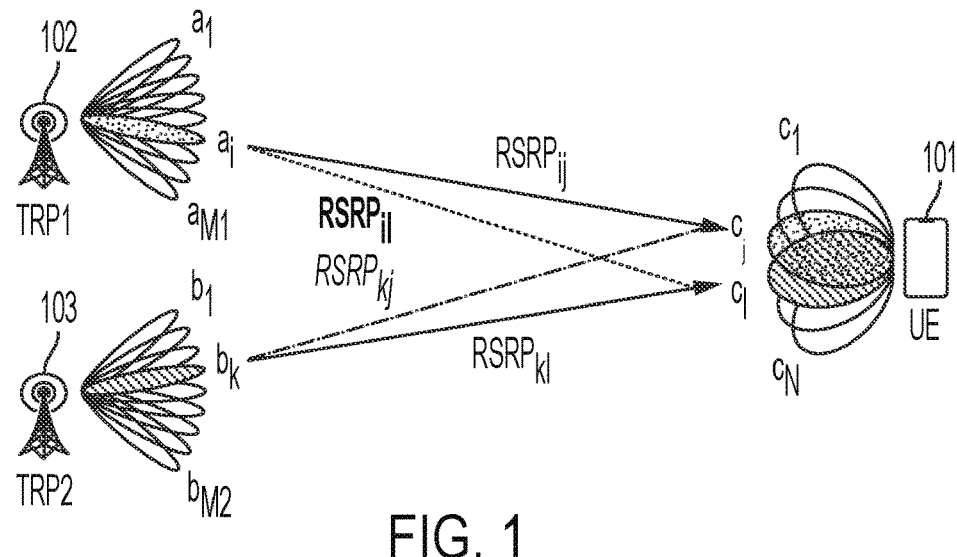
FIG. 1 illustrates an example of a network configuration for GBBR, according to various exemplary embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and non-transitory computer program products for group-based beam reporting (GBBR) for multi-receiver (Rx) operation based on reference signal received power (RSRP) differences. Although the devices discussed below and shown in the figures refer to 5G/6G or Next Generation NodeB (gNB) devices and user equipment (UE) devices, this disclosure is not limited to only gNBs and UEs.

It may be readily understood that the components of certain example embodiments, as generally described and illustrated in the figures herein, may be arranged and designed in a wide variety of different configurations. Different reference designations from multiple figures may be used out of sequence in the description, to refer to a same element to illustrate their features or functions. If desired, the different functions or procedures discussed herein may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

3GPP technologies may define minimum specifications for UEs for multi-Rx chain downlink (DL) reception. A UE may have one or multiple antenna panels. In frequency range 2 (FR2), 4-layer multiple input multiple output (MIMO) reception requires beam reception from at least two directions. In FR2, carrier aggregation (CA) with independent beam management (IBM) and/or common beam management (CBM) may be supported with simultaneous DL reception on different component carriers from co-located and/or non-co-located transmission reception points (TRPs).

The UE may support IBM by performing DL simultaneous reception on different antenna panels using separate beams on different component carriers. A UE with IBM capabilities may have increased UE baseband and RF capabilities, such as multiple baseband chains and/or support of multiple antenna panels. Simultaneous reception may require support of simultaneous multi-panel operation(s) with multiple independent Rx beams and/or chains at the UE side. Multi-beam simultaneous reception and multiple Rx chains may provide performance improvements in FR2 by improving demodulation performance (4-layer DL MIMO), radio resource management (RRM) performance and/or radio frequency (RF) spherical coverage. Simultaneous reception may include situations in which dual data, dual reference signals (RF), and/or data and an RS are simultaneously received.

Single transmission configuration indicator (TCI) reception on different beams has been supported by RAN1 3GPP specifications using a Type I codebook, which may be achieved at the UE with either a single antenna panel or multiple antenna panels. Alternatively, dual TCI operation may be combined with a multiple TRP (mTRP) framework in, for example, a situation in which the base station is deployed as a single TRP.

GBBR may have a signaling framework provided for multi-TRP operation to enable UE measurement reporting of highest quality DL transmission (Tx) beam pairs and/or groups from a set of configured measurement resources. The set of configured measurement resources may be, for example, a synchronization signal block (SSB) or a channel state information reference signal (CSI-RS). In multi-TRP operations, a serving cell may schedule the UE from two TRPs, which may provide improved coverage, reliability and/or data rates for a physical downlink shared channel (PDSCH), a physical downlink control channel (PDCCH), a physical uplink shared channel (PUSCH), and a physical uplink control channel (PUCCH).

During GBBR, the UE may perform simultaneous DL data reception from different quasi co-location Type D (QCL-D) sources, as may be defined by 3GPP specifications. The UE may be configured with a radio resource control (RRC) configuration parameter (e.g., groupBasedBeamReporting) set as enabled. The UE may be configured with at least two different sets of Layer 1 (L1) measurement resources that are associated with two different active TRPs. The UE may measure the L1-RSRP from the RSs related to the at least two sets, constituting Tx beam pairs and/or groups. The UE may report the measurements in a single reporting instance, which may include one or more different groups of RSs, where the reporting of a group indicates that the UE may receive simultaneously from TCI states related to the group.

As an example, 3GPP specifications may define that an information element (e.g., CSI-ReportConfig) includes a parameter (e.g., groupBasedBeamReporting), and a parameter (e.g., groupBasedBeamReporting-r17) which may enable GBBR for mTRP. The parameter reportQuantity may be used for configuring contents of CSI-ReportConfig. For example, a parameter cri-RSRP may be used when the Channel Measurement Resource (CMR) sets have CSI-RS resources configured. As another example, a parameter ssb-Index-RSRP may be used when the CMR sets have SSB resources configured. The parameter nrofReportedGroups-r17 may be used to configure the number of Tx beam pairs and/or groups to be reported.

FIG. 1 illustrates an example of a network configuration for GBBR, according to various exemplary embodiments. This exemplary network configuration may include a UE 101, a first TRP (TRP1) 102, and a second TRP (TRP2) 103. In this GBBR example, the network may transmit a first RS set ($RS_1, \ldots, RS_{M1}$) from TRP1 102 using different Tx beams ($a_1, \ldots, a_{M1}$). The UE 101 may measure the first RS set ($RS_1, \ldots, RS_{M1}$) using different Rx beams ($c_1, \ldots, c_N$) and may determine a first Tx/Rx beam pair ($a_i, c_j$) for transmissions from TRP1 102, such as determining a first Tx/Rx pair which results in the largest L1-RSRP ($RSRP_{ij}$). Similarly, the network may transmit a second RS set ($RS'_1, \ldots, RS'_{M2}$) from TRP2 103 using different Tx beams ($b_1, \ldots, b_{M2}$). The UE 101 may measure the second RS set ($RS'_1, \ldots, RS'_{M2}$) using different Rx beams ($c_1, \ldots, c_N$) and may determine a second Tx/Rx beam pair ($b_k, c_l$) for transmissions from TRP2 103, such as determining a second Tx/Rx beam pair which results in the largest L1-RSRP ($RSRP_{kl}$). The UE 101 may then report an RS group {$RS_i$, $RS'_k$} to the network, corresponding to the group of Tx beams {$a_i, b_k$}.

As the beam selection may be performed independently for each TRP, any potential cross-interference ($RSRP_{kj}$, $RSRP_{il}$) among the simultaneous DL transmissions may not be taken into account. In conventional GBBR operations, using the example configuration shown in FIG. 1, the Rx beams ($c_j, c_l$) may overlap significantly in space and may result in significant cross-interference between the DL transmissions using Tx/Rx beam pairs ($a_i, c_j$) and ($b_k, c_l$).

Various example embodiments may provide technological advantages to account for RS cross-interference by evaluating whether a difference between the RSRP level measurements of multiple reference signals exceeds or does not exceed one or more thresholds. For example, for both Tx/Rx beam pairs ($a_i, c_j$) and ($b_k, c_l$), the received power of a desired RS ($RSRP_{ij}$ and $RSRP_{kl}$, respectively) may need to be sufficiently stronger than the received power of an undesired RS ($RSRP_{kj}$ and $RSRP_{il}$, respectively).

The RS cross-interference may be accounted for in the determination of whether a difference between the RSRP level measurements of multiple reference signals exceeds or does not exceed one or more thresholds using evaluations of each RS relative to each other. For example, the determination may be based on the following Equation (1) and Equation (2):

$$RSRP_{ij} - RSRP_{kj} > threshold \qquad (1)$$

$$RSRP_{kl} - RSRP_{il} > threshold \qquad (2)$$

Various example embodiments may provide one or more procedures to enhance a GBBR framework by taking into account potential cross-interference among at least two simultaneous DL transmissions to be received by a multi-Rx UE. For example, the potential cross-interference may be as a result of significant spatial overlap among the respective receive beams ($c_1, c_2$), a presence of high-gain side lobes, and/or the like. Certain exemplary embodiments may provide that the UE may determine at least two RSRP differences ($A_1, A_2$), one for each receive beam ($c_1, c_2$), by measuring reference signals (RS) ($RS_1, RS_2$) transmitted by the network with different transmit beams and/or from different locations (e.g., TRPs). The UE may then either report the RSRP differences ($\Delta_1$, $\Delta_2$) for consideration by the network or use the RSRP differences ($\Delta_1$, $\Delta_2$) to determine whether to exclude a corresponding candidate RS group ({$RS_1$, $RS_2$}) from a GBBR.

Some exemplary embodiments may provide one or more procedures for enhancing the GBBR framework to enable a better selection and reporting the strongest DL beam pair or group. Various exemplary embodiments may improve the quality of simultaneous receptions for a multi-Rx UE by taking into account potential cross-interference among the corresponding simultaneous DL transmissions, such as, for example, due to spatial overlap among the respective Rx beams at the UE. Using Layer-1 Signal-to-Interference-plus-Noise Ratio (L1-SINR) measurements may increase UE complexity and signaling overhead and may not accurately reflect the actual cross-interference potential between the simultaneous DL transmissions for the multi-RX UE. For example, a relatively low L1-SINR measurement may be caused by signals being transmitted in neighboring cells at the time of measurement.

Various exemplary embodiments may advantageously improve upon the GBBR reporting based on L1-RSRP measurements by ensuring that, for both Tx/Rx beam pairs ($a_i$, $c_j$) and ($b_k$, $c_l$), the received power of a desired RS ($RSRP_{ij}$ and $RSRP_{kl}$, respectively) is sufficiently stronger than the received power of an undesired RS ($RSRP_{kj}$ and $RSRP_{il}$, respectively). The L1-RSRP measurements may be already available at the UE, such as, for example, the L1-RSRP measurements may have been performed for the purpose of beam alignment with the network, thus dedicated measurements for cross-interference based GBBR may not be necessary. This may increase resource efficiency and save energy.

Some exemplary embodiments may provide that a UE may have at least two beams ($c_1$, $c_2$) available for simultaneous reception, such as, for example, one on each side of a handheld mobile UE. The UE may use a first beam ($c_1$) to receive from a first TRP (TRP1) and a second beam ($c_2$) to receive from a second TRP (TRP2). For a candidate RS group {$RS_i$, $RS_2$}, the UE may determine a first difference ($\Delta_1$=$RSRP_{11}$-$RSRP_{21}$) based on measurements on $RS_1$ and $RS_2$ using the first beam ($c_1$). The UE may also determine a second difference ($\Delta_2$=$RSRP_{22}$-$RSRP_{12}$) based on measurements on $RS_i$ and $RS_2$ using the second beam ($c_2$). The measurements on $RS_1$ and $RS_2$ using a particular beam ($c_1$, $c_2$) may or may not be performed simultaneously, e.g., may be performed in parallel (in case $RS_1$ and $RS_2$ are transmitted simultaneously), or may be performed sequentially (in case $RS_1$ and $RS_2$ are transmitted at different times).

Certain exemplary embodiments may provide that the UE may have a number N of beams ($c_1$, . . . , $c_N$) available, from which any Rx beam pair ($c_j$, $c_l$) may be selected and/or used for simultaneous reception. Some exemplary embodiments may provide one or multiple Rx beam pairs which may be restricted to, for example, Rx beams on different panels which may be used simultaneously. For example, a first plurality or subset ($S_1$) of candidate beams for receiving a first transmission may comprise Rx beams relating to a first antenna panel and a second plurality or subset ($S_2$) of candidate beams for receiving a second transmission may comprise Rx beams relating to a second antenna panel. Various exemplary embodiments may also, or alternatively, provide that the one or multiple Rx beam pairs are not restricted, and the first and second pluralities or subsets ($S_1$, $S_2$) may be equal to a complete set (S) of all available beams at the UE (i.e., $S_1$=$S_2$=S).

A first difference ($\Delta_1$) may be determined as a largest ($\Delta_1$=$max_j$ $\Delta_j$) among the respective first differences ($\Delta_j$=$RSRP_{ij}$-$RSRP_{2j}$) corresponding to the candidate Rx beam(s) ($c_j$) from the first subset ($S_1$). The UE may search for a first Rx beam ($c_j$) which maximizes a received signal strength from $RS_1$ (i.e., $RSRP_{ij}$) while minimizing the received signal strength from $RS_2$ (i.e., $RSRP_{2j}$).

Further, a second difference ($\Delta_2$) may be determined as the largest ($\Delta_2$=$max_l$ $\Delta_l$) among the respective second differences ($\Delta_l$=$RSRP_{2l}$-$RSRP_{1l}$) corresponding to the candidate Rx beams ($c_l$) from the second subset ($S_2$). The UE may search for a second Rx beam ($c_l$) which maximizes the received signal strength from $RS_2$ (i.e., $RSRP_{2l}$) while minimizing the received signal strength from $RS_1$ (i.e., $RSRP_{1l}$).

Various exemplary embodiments may provide one or more thresholds ($Th_1$, $Th_2$) which may be configured (e.g., by the network) or pre-defined. For each candidate RS group {$RS_1$, $RS_2$}, the UE may compare the first and second differences ($\Delta_1$, $\Delta_2$) with the one or more threshold(s) ($Th_1$, $Th_2$) to determine whether the candidate RS group {$RS_1$, $RS_2$} may be included in or excluded from a GBBR. For example, as a result, the network may prevent the UE from reporting any candidate RS group {$RS_1$, $RS_2$} for which the first difference does not exceed a first threshold ($\Delta_1$<$Th_1$) and/or the second difference does not exceed a second threshold ($\Delta_2$<$Th_2$). This failure to exceed the first and/or second threshold may indicate to the network that the UE will not be able to sufficiently separate, via any pair of candidate Rx beams, the DL signals to be transmitted via the Tx beams associated with the candidate RS group {$RS_1$, $RS_2$}. After excluding the one or more candidate RS groups, the UE may use other and/or additional criteria to select which candidate RS groups to report, such as RSRP, channel rank, and/or the like.

The first and second thresholds ($Th_1$, $Th_2$) may depend on a modulation and coding scheme ($MCS_1$, $MCS_2$) to be used for the DL transmissions. For example, certain exemplary embodiments may provide a situation in which the network expects to use a robust MCS and the one or more thresholds may be configured to a lower value. Some exemplary embodiments may provide a situation in which the network may expect to use a relatively less robust MCS and the one or more thresholds may be configured to a relatively higher value.

The one or more thresholds may be based on a strength of the received power of the desired RS. For example, the first threshold ($Th_1$) may be configured to a relatively lower value (i.e., more cross-interference from $RS_2$ may be allowed) in case the received power of $RS_1$ is strong, and/or the second threshold ($Th_2$) may be configured to a higher value (i.e., less cross-interference from $RS_1$ may be allowed) in case the received power of $RS_2$ is weak. The first and second thresholds ($Th_1$, $Th_2$) may be equivalent and/or a single threshold.

Various exemplary embodiments may provide that the network may not impose restrictions on GBBR, and the network may configure the UE to report the first and second differences ($\Delta_1$, $\Delta_2$). The GBBR and the first and second differences ($\Delta_1$, $\Delta_2$) may be used by a DL scheduler, for example, when determining a suitable MCS for the simultaneous DL transmissions. A relatively smaller difference ($\Delta_1$ or $\Delta_2$) may cause the DL scheduler to select a more robust MCS for the corresponding DL transmission. A larger difference ($\Delta_1$ or $\Delta_2$) may cause the DL scheduler to select a less robust MCS, which may result in maximizing spectral efficiency.

In determining which candidate RS group(s) to report, certain exemplary embodiments may provide that the UE may evaluate and rank the candidate RS group(s) according to, for example, certain criteria and/or a ranking algorithm. The criteria and/or ranking algorithm may include a potential cross-interference. For example, the UE may assign a quality metric ($\rho_{12}$) to a candidate RS group $\{RS_1, RS_2\}$ based on the first and second differences ($\Delta_1, \Delta_2$). The quality metric ($\rho_{12}$) may be based on the smaller one between the first difference ($\Delta_1$) and the second difference ($\Delta_2$) (i.e., $\min(\Delta_1, \Delta_2)$). For example, a relatively higher quality metric ($\rho_{12}$) may be assigned in case $\min(\Delta_1, \Delta_2)$ is large, while a relatively lower quality metric ($\rho_{12}$) may be assigned in case $\min(\Delta_1, \Delta_2)$ is small. A relatively larger value of $\min(\Delta_1, \Delta_2)$ may mean that the UE has an improved capability to separate, via at least one pair of Rx beams, the DL signals to be transmitted via Tx beams associated with the candidate RS group $\{RS_1, RS_2\}$.

Once the quality metric ($\rho_{12}$) has been determined for each candidate RS group $\{RS_i, RS_k\}$, the UE may include, in the GBBR, one or more candidate RS groups $\{RS_i, RS_k\}$ with the highest quality metric ($\rho_{ik}$), up to a configured number (e.g., nrofReportedGroups-r17) of candidate RS groups to be reported. In some exemplary embodiments, a minimum quality metric ($\mu_{min}$) may be configured or predefined to prevent the UE from reporting a candidate RS group with a corresponding quality metric below a minimum.

Certain exemplary embodiments may provide that the UE may have a number N of beams ($c_1, \ldots, c_N$) available, from which any subset of K Rx beams, or at least some of the possible subsets of K RX beams, may be used for simultaneous reception of K concurrent transmissions. For example, the UE may use each of the K Rx beams ($c_n$, n=1, ..., K) to receive from a different TRP out of K TRPs. For each candidate RS ($RS_n$, n=1, ..., K) in a given candidate RS group $\{RS_1, RS_2, \ldots, RS_K\}$, the UE may determine a corresponding difference ($\Delta_n = RSRP_{mn} - \text{sum}_{m \neq n} RSRP_{mn}$) between an RSRP ($RSRP_{mn}$) associated with the candidate RS ($RS_n$) and a sum of all RSRPs ($\text{sum}_{m \neq n} RSRP_{mn}$) associated with all other candidate RSs ($RS_m$, m≠n). The RSRP measurements on all candidate RSs ($RS_1, RS_2, \ldots, RS_K$) may be performed using a (e.g., same) corresponding beam ($c_n$) of the UE.

Figure 2:
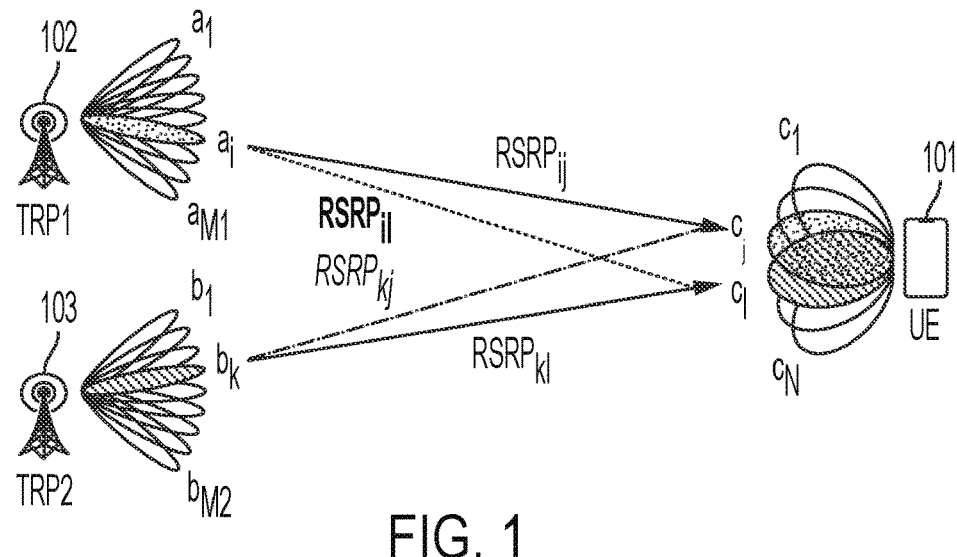
FIG. 2 illustrates a signal diagram for one or more procedures, according to certain exemplary embodiments.

FIG. 2 illustrates a signal diagram for one or more procedures, according to various example embodiments. The one or more procedures may be performed by a configuration of, for example, a network entity or base station (e.g., gNB) 201, a first TRP1 202, a second TRP2 203, and a UE 204. The one or more procedures may provide, at 210, the gNB 201 may provide one or more channel measurement resource (CMR) configurations to the UE 204. At 220, the one or more procedures may provide that the UE 204 may determine a candidate RS group $\{RS_1, RS_2\}$ for a GBBR. At 230, the TRP1 202 may transmit a first $RS_1$ to the UE 204, which is received by the UE 204, and at 240, the TRP2 203 may transmit a second $RS_2$ to the UE 204, which is received by the UE 204.

Certain exemplary embodiments may provide, at 250, the UE 204 may determine a first difference ($\Delta_1 = RSRP_{11} - RSRP_{21}$) based on a first Rx beam $c_1$, and at 260, the UE 204 may determine a second difference ($\Delta_2 = RSRP_{22} - RSRP_{12}$) based on a second Rx beam $c_2$. At 270, the UE 204 may determine whether to include or exclude a candidate RS group $\{RS_1, RS_2\}$ for a GBBR based on the first and second differences ($\Delta_1$ and $\Delta_2$). At 280, the UE 204 may transmit a GBBR to the gNB 201, which may include the first and second differences ($\Delta_1$ and $\Delta_2$).

FIG. 3 illustrates an example flow diagram of a method, according to certain exemplary embodiments. In an example embodiment, the method of FIG. 3 may be performed by a network element, or a group of multiple network elements in a 3GPP system, such as LTE or 5G-NR. For instance, in an example embodiment, the method of FIG. 3 may be performed by a UE similar to apparatus 410 illustrated in FIG. 4.

According to various exemplary embodiments, the method of FIG. 3 may include, at 310, determining a candidate reference signal group to be provided to at least one other apparatus. The candidate reference signal group may include at least a first reference signal and a second reference signal. At 320, the method may include determining, based on a first receive beam of the apparatus, a first difference between a first reference signal received power of the first reference signal and a second reference signal received power of the second reference signal. At 330, the method may further include determining, based on a second receive beam of the apparatus, a second difference between a third reference signal received power of the second reference signal and a fourth reference signal received power of the first reference signal. At 340, the method may include performing at least one of excluding the candidate reference signal group from a group-based beam report based on the first difference and the second difference, or transmitting, to the at least one other apparatus, information indicative of the first difference and the second difference.

Certain exemplary embodiments may provide that the method includes transmitting, to the at least one other apparatus, the group-based beam report comprising the candidate reference signal group. The method may also include determining, for each candidate receive beam from a first subset of candidate receive beams for receiving a first transmission, a respective first difference between a respective first reference signal received power of the first reference signal and a respective second reference signal received power of the second reference signal, and determining the first difference as the largest among the respective first differences corresponding to the candidate receive beams from the first subset. The method may include determining, for each candidate receive beam from a second subset of candidate receive beams for receiving a second transmission, a respective second difference between a respective third reference signal received power of the second reference signal and a respective fourth reference signal received power of the first reference signal, and determining the second difference as the largest among the respective second differences corresponding to the candidate receive beams from the second subset.

Some exemplary embodiments may provide that the first and second subset of candidate receive beams may be equal to a set of receive beams available at the apparatus. The method may also include determining whether the first difference and the second difference exceed at least one threshold, and perform at least one of, when the first difference and the second difference both exceed the at least one threshold, determining to further consider the candidate reference signal group for inclusion in the group-based beam report, or when at least one of the first difference or the second difference does not exceed the at least one threshold, determining to exclude the candidate reference signal group from the group-based beam report.

Various exemplary embodiments may provide that the at least one threshold is configured by a network entity. The at least one threshold may be based on a modulation and coding scheme. The at least one threshold may include a first threshold for the first difference and a second threshold for the second difference. The first threshold may be based on the first reference signal received power of the first reference signal and the second threshold may be based on the third reference signal received power of the second reference signal. The method may further include determining a quality metric for the candidate reference signal group based on at least the first difference and the second difference. The method may also include determining the quality metric for the candidate reference signal group based on a smaller one among the first difference and the second difference.

Certain exemplary embodiments may provide that the method may include determining a plurality of candidate reference signal groups, which includes the candidate reference signal group. Each candidate reference signal group of the plurality of candidate reference signal groups may include at least corresponding first and second reference signals. The method may further include determining a corresponding quality metric for each candidate reference signal group of the plurality of candidate reference signal groups and transmitting the candidate reference signal groups with highest quality metric, up to a configured number of candidate reference signal groups to be reported, in the group-based beam report. The method may also include excluding, from the group-based beam report, one or more candidate reference signal groups of the plurality of candidate reference signal groups for which the corresponding quality metric is below a minimum quality metric threshold.

Various exemplary embodiments may provide that the method includes determining, for each candidate reference signal in one group of the plurality of candidate reference signal groups, a corresponding difference between a reference signal received power associated with the candidate reference signal and a sum of reference signal received powers associated with all other candidate reference signals in the one group of the plurality of candidate reference signal groups. The method may also include performing at least one of excluding the one group from the group-based beam report based on the corresponding differences for each candidate reference signal in the one group, or transmitting, to the at least one other apparatus, information indicative of the corresponding differences for each candidate reference signal in the one group.

Figure 4:
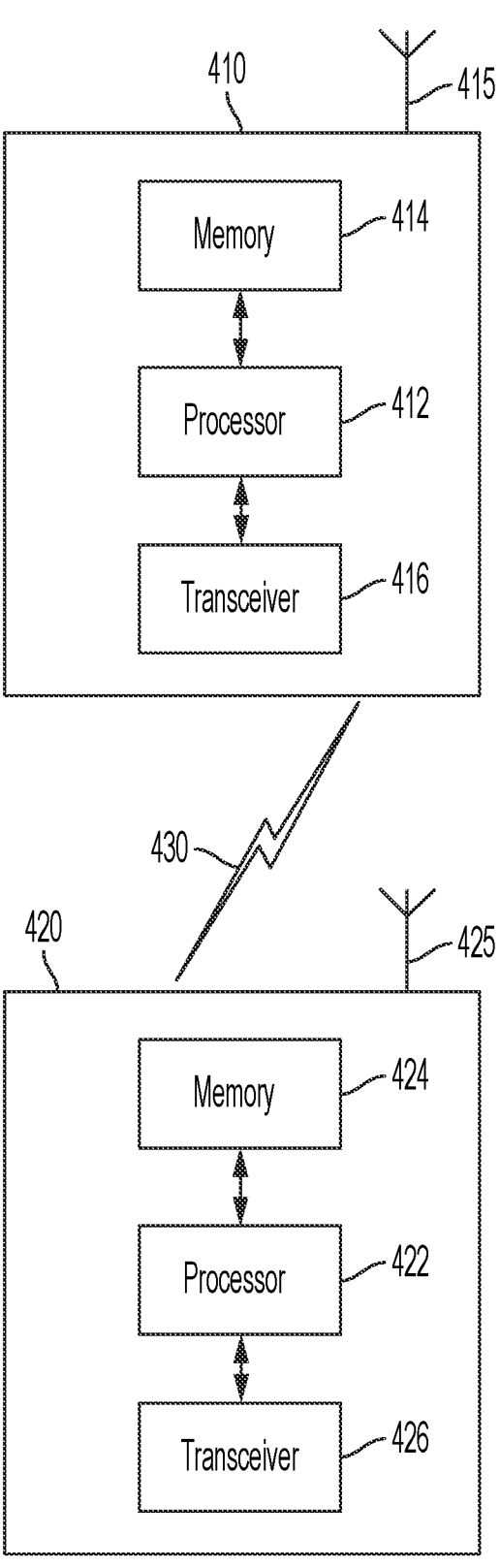
FIG. 4 illustrates a set of apparatuses, according to various exemplary embodiments.

FIG. 4 illustrates apparatuses 410 and 420 according to various example embodiments. In the various example embodiments, apparatus 410 may be an element in a network or associated with such a network, such as a UE. UE 302 may be an example of apparatus 410 according to various example embodiments as discussed above. It should be noted that one of ordinary skill in the art would understand that apparatus 410 may include components or features not shown in FIG. 4. Further, the apparatus 420 may be an element in a network or associated with such a network, such as a PCF. PCF 705 may be examples of apparatus 420 according to various example embodiments as discussed above. It should be noted that one of ordinary skill in the art would understand that apparatus 420 may include components or features not shown in FIG. 4.

According to various example embodiments, the apparatuses 410 and/or 420 may include one or more processors, one or more computer-readable storage medium (for example, memory, storage, or the like), one or more radio access components (for example, a modem, a transceiver, or the like), and/or a user interface. In some example embodiments, apparatuses 410 and/or 420 may be configured to operate using one or more radio access technologies, such as GSM, LTE, LTE-A, NR, 5G, WLAN, WiFi, NB-IoT, Bluetooth, NFC, MulteFire, and/or any other radio access technologies.

As illustrated in the example of FIG. 4, apparatuses 410 and/or 420 may include or be coupled to processors 412 and 422, respectively, for processing information and executing instructions or operations. Processors 412 and 422 may be any type of general or specific purpose processor. In fact, processors 412 and 422 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 412 (422) for each of apparatuses 410 and/or 420 is shown in FIG. 4, multiple processors may be utilized according to other example embodiments. For example, it should be understood that, in certain example embodiments, apparatuses 410 and/or 420 may include two or more processors that may form a multiprocessor system (for example, in this case processors 412 and 422 may represent a multiprocessor) that may support multiprocessing. According to certain example embodiments, the multiprocessor system may be tightly coupled or loosely coupled to, for example, form a computer cluster).

Processors 412 and 422 may perform functions associated with the operation of apparatuses 410 and/or 420, respectively, including, as some examples, precoding of antenna gain/phase parameters, encoding and decoding of individual bits forming a communication message, formatting of information, and overall control of the apparatuses 410 and/or 420, including processes illustrated in FIGS. 1-3.

Apparatuses 410 and/or 420 may further include or be coupled to memory 414 and/or 424 (internal or external), respectively, which may be coupled to processors 412 and 422, respectively, for storing information and instructions that may be executed by processors 412 and 422. Memory 414 (memory 424) may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 414 (memory 424) can be comprised of any combination of random access memory (RAM), read only memory (ROM), static storage such as a magnetic or optical disk, hard disk drive (HDD), or any other type of non-transitory machine or computer readable media. The instructions stored in memory 414 and memory 424 may include program instructions or computer program code that, when executed by processors 412 and 422, enable the apparatuses 410 and/or 420 to perform tasks as described herein.

In certain example embodiments, apparatuses 410 and/or 420 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processors 412 and 422 and/or apparatuses 410 and/or 420 to perform any of the methods illustrated in FIGS. 1-3.

In some example embodiments, apparatuses 410 and/or 420 may also include or be coupled to one or more antennas 415 and 425, respectively, for receiving a downlink signal and for transmitting via an uplink from apparatuses 410 and/or 420. Apparatuses 410 and/or 420 may further include transceivers 416 and 426, respectively, configured to transmit and receive information. The transceivers 416 and 426 may also include a radio interface (for example, a modem) respectively coupled to the antennas 415 and 425. The radio interface may correspond to a plurality of radio access technologies including one or more of GSM, LTE, LTE-A, 5G, NR, WLAN, NB-IoT, Bluetooth, BT-LE, NFC, RFID, UWB, or the like. The radio interface may include other components, such as filters, converters (for example, digital-to-analog converters or the like), symbol demappers, signal shaping components, an Inverse Fast Fourier Transform (IFFT) module, or the like, to process symbols, such as OFDMA symbols, carried by a downlink or an uplink.

For instance, transceivers 416 and 426 may be respectively configured to modulate information on to a carrier waveform for transmission by the antenna(s) 415 and 425, and demodulate information received via the antenna(s) 415 and 425 for further processing by other elements of apparatuses 410 and/or 420. In other example embodiments, transceivers 416 and 426 may be capable of transmitting and receiving signals or data directly. Additionally or alternatively, in some example embodiments, apparatuses 410 and/or 420 may include an input and/or output device (I/O device). In certain example embodiments, apparatuses 410 and/or 420 may further include a user interface, such as a graphical user interface or touchscreen.

In certain example embodiments, memory 414 and memory 424 store software modules that provide functionality when executed by processors 412 and 422, respectively. The modules may include, for example, an operating system that provides operating system functionality for apparatuses 410 and/or 420. The memory may also store one or more functional modules, such as an application or program, to provide additional functionality for apparatuses 410 and/or 420. The components of apparatuses 410 and/or 420 may be implemented in hardware, or as any suitable combination of hardware and software. According to certain example embodiments, apparatus 410 may optionally be configured to communicate with apparatus 420 via a wireless or wired communications link 430 according to any radio access technology, such as NR.

According to certain example embodiments, processors 412 and 422, and memory 414 and 424 may be included in or may form a part of processing circuitry or control circuitry. In addition, in some example embodiments, transceivers 416 and 426 may be included in or may form a part of transceiving circuitry.

For instance, in certain example embodiments, the apparatus 410 may be controlled by the memory 414 and the processor 412 to determine a candidate reference signal group to be provided to at least one other apparatus 420. The candidate reference signal group may include at least a first reference signal and a second reference signal. The apparatus 410 may also be caused to determine, based on a first receive beam of the apparatus 410, a first difference between a first reference signal received power of the first reference signal and a second reference signal received power of the second reference signal, and determine, based on a second receive beam of the apparatus 410, a second difference between a third reference signal received power of the second reference signal and a fourth reference signal received power of the first reference signal. The apparatus 410 may further be caused to perform at least one of excluding the candidate reference signal group from a group-based beam report based on the first difference and the second difference, or transmitting, to the at least one other apparatus 420, information indicative of the first difference and the second difference.

In some example embodiments, an apparatus (e.g., apparatus 410 and/or apparatus 420) may include means for performing a method, a process, or any of the variants discussed herein. Examples of the means may include one or more processors, memory, controllers, transmitters, receivers, and/or computer program code for causing the performance of the operations.

Various example embodiments may be directed to an apparatus, such as apparatus 410, that includes means for determining a candidate reference signal group to be provided to at least one other apparatus 420. The candidate reference signal group may include at least a first reference signal and a second reference signal. The apparatus 410 may also include means for determining, based on a first receive beam of the apparatus 410, a first difference between a first reference signal received power of the first reference signal and a second reference signal received power of the second reference signal, and means for determining, based on a second receive beam of the apparatus 410, a second difference between a third reference signal received power of the second reference signal and a fourth reference signal received power of the first reference signal. The apparatus 410 may further include means for performing at least one of excluding the candidate reference signal group from a group-based beam report based on the first difference and the second difference, or transmitting, to the at least one other apparatus 420, information indicative of the first difference and the second difference.

As used herein, the term "circuitry" may refer to hardware-only circuitry implementations (for example, analog and/or digital circuitry), combinations of hardware circuits and software, combinations of analog and/or digital hardware circuits with software/firmware, any portions of hardware processor(s) with software, including digital signal processors, that work together to cause an apparatus (for example, apparatus 410 and/or 420) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor or multiple processors, or portion of a hardware circuit or processor, and the accompanying software and/or firmware. The term circuitry may also cover, for example, a baseband integrated circuit in a server, cellular network node or device, or other computing or network device.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (for example, apparatuses 410 and/or 420), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) and/or sixth (6G) technology.

Partial Glossary

3GPP 3rd Generation Partnership Project
5G 5th Generation 6G 6<sup>th</sup> Generation
BS Base Station
CMR Channel Measurement Resource
DL Downlink
EMBB Enhanced Mobile Broadband
FR2 Frequency Range 2
gNB 5G or Next Generation NodeB
ID Identifier
L1 Layer 1
LTE Long Term Evolution
MCS Modulation and Coding Scheme
NR New Radio
QCL-D Quasi Co-Located Type D
RS Reference Signal
RSRP Reference Signal Received Power
SINR Signal-to-Interference-plus-Noise Ratio
TCI Transmission Configuration Indication
TRP Transmission/Reception Point
UE User Equipment
UL Uplink

We claim:

1. An apparatus comprising:
at least one processor; and
at least one memory storing instructions that, when executed by the at least one processor, cause the apparatus at least to:
   determining a candidate reference signal group to be provided to at least one other apparatus, wherein the candidate reference signal group comprises at least a first reference signal and a second reference signal;
   determining, based on a first receive beam of the apparatus, a first difference between a first reference signal received power of the first reference signal and a second reference signal received power of the second reference signal;
   determining, based on a second receive beam of the apparatus, a second difference between a third reference signal received power of the second reference signal and a fourth reference signal received power of the first reference signal;
   excluding the candidate reference signal group from a group-based beam report based on the first difference and the second difference;
   transmitting, to the at least one other apparatus, information indicative of the first difference and the second difference;
   determining, for each candidate receive beam from a first subset of candidate receive beams for receiving a transmission, a respective third difference between a respective third reference signal received power of the first reference signal and a respective fourth reference signal received power of the second reference signal;
   determining the third difference as a largest among respective differences corresponding to the candidate receive beams from the first subset;
   determining, for each candidate receive beam from a second subset of candidate receive beams for receiving a second transmission, a respective fourth difference between a respective fifth reference signal received power of the second reference signal and a respective sixth reference signal received power of the first reference signal;
   determining the second difference as a largest among respective differences corresponding to the candidate receive beams from the second subset, wherein the first and second subset of candidate receive beams are equal to a set of receive beams available at the apparatus; and transmitting, to the at least one other apparatus, information indicative of the third difference and the fourth difference.

2. The apparatus according to claim 1, wherein the instructions, when executed by the at least one processor, further cause the apparatus to:

transmit, to the at least one other apparatus, the group-based beam report comprising the candidate reference signal group.

3. The apparatus according to claim 2, the instructions, when executed by the at least one processor, further cause the apparatus to:

determine a plurality of candidate reference signal groups, which includes a candidate reference signal group, wherein each candidate reference signal group of the plurality of candidate reference signal groups comprises at least corresponding first and second reference signals;

determine a corresponding quality metric for each candidate reference signal group of the plurality of candidate reference signal groups; and transmit the candidate reference signal groups with highest quality metric, up to a configured number of candidate reference signal groups to be reported, in the group-based beam report.

4. The apparatus according to claim 3, wherein the instructions, when executed by the at least one processor, further cause the apparatus to:

exclude, from the group-based beam report, one or more candidate reference signal groups of the plurality of candidate reference signal groups for which the corresponding quality metric is below a minimum quality metric threshold.

5. The apparatus according to claim 4, wherein the instructions, when executed by the at least one processor, further cause the apparatus to:

determine, for each candidate reference signal in one group of the plurality of candidate reference signal groups, a corresponding difference between a reference signal received power associated with the candidate reference signal and a sum of reference signal received powers associated with all other candidate reference signals in the one group of the plurality of candidate reference signal groups; and perform the following operations:

exclude the one group from the group-based beam report based on corresponding differences for each candidate reference signal in the one group; and transmitting, to the at least one other apparatus, information indicative of the corresponding differences for each candidate reference signal in the one group.

6. A system comprising:

apparatus comprising:

at least one processor; and at least one memory storing instructions that, when executed by the at least one processor, cause the apparatus at least to:

determining a candidate reference signal group to be provided to at least one other apparatus, wherein the candidate reference signal group comprises at least a first reference signal and a second reference signal;

determining, based on a first receive beam of the apparatus, a first difference between a first reference signal received power of the first reference signal and a second reference signal received power of the second reference signal;

determining, based on a second receive beam of the apparatus, a second difference between a third reference signal received power of the second reference signal and a fourth reference signal received power of the first reference signal;

excluding the candidate reference signal group from a group-based beam report based on the first difference and the second difference;

transmitting, to the at least one other apparatus, information indicative of the first difference and the second difference;

determining, for each candidate receive beam from a first subset of candidate receive beams for receiving a transmission, a respective third difference between a respective third reference signal received power of the first reference signal and a respective fourth reference signal received power of the second reference signal;

determining the third difference as a largest among respective differences corresponding to the candidate receive beams from the first subset;

determining, for each candidate receive beam from a second subset of candidate receive beams for receiving a second transmission, a respective fourth difference between a respective fifth reference signal received power of the second reference signal and a respective sixth reference signal received power of the first reference signal;

determining the second difference as a largest among respective differences corresponding to the candidate receive beams from the second subset, wherein the first and second subset of candidate receive beams are equal to a set of receive beams available at the apparatus; and transmitting, to the at least one other apparatus, information indicative of the third difference and the fourth difference.

7. The system according to claim 6, wherein the instructions, when executed by the at least one processor, further cause the apparatus to:

transmit, to the at least one other apparatus, the group-based beam report comprising the candidate reference signal group.

8. The system according to claim 7, the instructions, when executed by the at least one processor, further cause the apparatus to:

determine a plurality of candidate reference signal groups, which includes a candidate reference signal group, wherein each candidate reference signal group of the plurality of candidate reference signal groups comprises at least corresponding first and second reference signals;

determine a corresponding quality metric for each candidate reference signal group of the plurality of candidate reference signal groups; and transmit the candidate reference signal groups with highest quality metric, up to a configured number of candidate reference signal groups to be reported, in the group-based beam report.

9. The system according to claim 8, wherein the instructions, when executed by the at least one processor, further cause the apparatus to:

exclude, from the group-based beam report, one or more candidate reference signal groups of the plurality of candidate reference signal groups for which the corresponding quality metric is below a minimum quality metric threshold.

10. The system according to claim 9, wherein the instructions, when executed by the at least one processor, further cause the apparatus to:

determine, for each candidate reference signal in one group of the plurality of candidate reference signal groups, a corresponding difference between a reference signal received power associated with the candidate reference signal and a sum of reference signal received powers associated with all other candidate reference signals in the one group of the plurality of candidate reference signal groups; and perform the following operations:

excluding the one group from the group-based beam report based on corresponding differences for each candidate reference signal in the one group; and transmitting, to the at least one other apparatus, information indicative of the corresponding differences for each candidate reference signal in the one group.

11. A method performed by an apparatus, the method comprising:

determining a candidate reference signal group to be provided to at least one other apparatus, wherein the candidate reference signal group comprises at least a first reference signal and a second reference signal;

determining, based on a first receive beam of the apparatus, a first difference between a first reference signal received power of the first reference signal and a second reference signal received power of the second reference signal;

determining, based on a second receive beam of the apparatus, a second difference between a third reference signal received power of the second reference signal and a fourth reference signal received power of the first reference signal;

excluding the candidate reference signal group from a group-based beam report based on the first difference and the second difference;

transmitting, to the at least one other apparatus, information indicative of the first difference and the second difference;

determining, for each candidate receive beam from a first subset of candidate receive beams for receiving a transmission, a respective third difference between a respective third reference signal received power of the first reference signal and a respective fourth reference signal received power of the second reference signal;

determining the third difference as a largest among respective differences corresponding to the candidate receive beams from the first subset;

determining, for each candidate receive beam from a second subset of candidate receive beams for receiving a second transmission, a respective fourth difference between a respective fifth reference signal received power of the second reference signal and a respective sixth reference signal received power of the first reference signal;

determining the second difference as a largest among respective differences corresponding to the candidate receive beams from the second subset, wherein the first and second subset of candidate receive beams are equal to a set of receive beams available at the apparatus; and transmitting, to the at least one other apparatus, information indicative of the third difference and the fourth difference.

12. The method according to claim 11, further comprising transmitting, to the at least one other apparatus, the group-based beam report comprising the candidate reference signal group.

13. The method according to claim 12, further comprising:

determining a plurality of candidate reference signal groups, which includes a candidate reference signal group, wherein each candidate reference signal group of the plurality of candidate reference signal groups comprises at least corresponding first and second reference signals;

determining a corresponding quality metric for each candidate reference signal group of the plurality of candidate reference signal groups; and transmitting the candidate reference signal groups with highest quality metric, up to a configured number of candidate reference signal groups to be reported, in the group-based beam report.

14. The method according to claim 13, further comprising excluding, from the group-based beam report, one or more candidate reference signal groups of the plurality of candidate reference signal groups for which the corresponding quality metric is below a minimum quality metric threshold.

15. The method according to claim 14, further comprising:

determining, for each candidate reference signal in one group of the plurality of candidate reference signal groups, a corresponding difference between a reference signal received power associated with the candidate reference signal and a sum of reference signal received powers associated with all other candidate reference signals in the one group of the plurality of candidate reference signal groups; and performing the following operations:

excluding the one group from the group-based beam report based on corresponding differences for each candidate reference signal in the one group; and transmitting, to the at least one other apparatus, information indicative of the corresponding differences for each candidate reference signal in the one group.

* * * * *